United States Patent
Gong et al.

(10) Patent No.: US 11,987,399 B2
(45) Date of Patent: May 21, 2024

(54) OFFSHORE ROCKET TRANSPORT AND LAUNCH METHOD

(71) Applicants: Ludong University, Yantai (CN); Land Sea Space (Yantai) Information Technology Co., Ltd., Yantai (CN)

(72) Inventors: Qingtao Gong, Yantai (CN); Yao Teng, Yantai (CN); Shoujun Wang, Yantai (CN); Haipeng Wang, Yantai (CN); Zhongyu Sun, Yantai (CN); Kechang Shen, Yantai (CN); Tianhua Jiang, Yantai (CN); Lu Liu, Yantai (CN); Liyan Jin, Yantai (CN); You He, Yantai (CN)

(73) Assignees: Ludong University, Yantai (CN); Land Sea Space (Yantai) Information Technology Co., Ltd., Yantai (CN)

( * ) Notice: Subject to any disclaimer, the term of this patent is extended or adjusted under 35 U.S.C. 154(b) by 111 days.

(21) Appl. No.: 17/965,828

(22) Filed: Oct. 14, 2022

(65) Prior Publication Data

US 2023/0286679 A1 Sep. 14, 2023

(30) Foreign Application Priority Data

Mar. 8, 2022 (CN) .......................... 202210219623.2

(51) Int. Cl.
 *F41F 3/04* (2006.01)
 *B64G 5/00* (2006.01)
 (Continued)

(52) U.S. Cl.
 CPC .................. *B64G 5/00* (2013.01); *F41F 3/04* (2013.01); *F42B 39/22* (2013.01); *B63G 1/00* (2013.01); *B64G 2005/005* (2013.01)

(58) Field of Classification Search
 CPC .......................................................... F41F 3/04
 (Continued)

(56) References Cited

U.S. PATENT DOCUMENTS

| 4,747,334 A | * | 5/1988 | Kuriiwa | F41F 3/07 |
| | | | | 114/259 |
| 4,916,999 A | * | 4/1990 | Palmer | F41F 3/04 |
| | | | | 89/1.8 |

(Continued)

FOREIGN PATENT DOCUMENTS

RU 2345925 C1 * 2/2009

OTHER PUBLICATIONS

Foreign reference and translation (Year: 2009).*

*Primary Examiner* — Reginald S Tillman, Jr.
(74) *Attorney, Agent, or Firm* — Bayramoglu Law Offices LLC

(57) ABSTRACT

An offshore rocket transport and launch method includes S1: assembling a rocket horizontally; S2: loading the assembled rocket as a whole into a transport cage; S3: transporting, by a transport vehicle, the transport cage loaded with the rocket to a wharf by land horizontal transport; S4: transferring the transport cage loaded with the rocket to a transport ship, and transporting the transport cage loaded with the rocket to an offshore rocket launch pad by sea transport; S5: hoisting, by a hoisting device, the transport cage loaded with the rocket to the rocket launch pad; S6: opening the transport cage, transferring the rocket to a launching position, and hoisting the transport cage away from the rocket launch pad; and S7: launching the rocket. The method effectively facilitates the offshore rocket transport and launch process, and prevents the rocket from being affected by the external environment during the launch process.

8 Claims, 4 Drawing Sheets

(51) Int. Cl.
*F42B 39/22* (2006.01)
*B63G 1/00* (2006.01)

(58) Field of Classification Search
USPC ............ 89/1.801, 1.802, 1.804, 1.805, 1.815
See application file for complete search history.

(56) References Cited

U.S. PATENT DOCUMENTS

| | | | | |
|---|---|---|---|---|
| 5,042,358 | A | * | 8/1991 | Kuriiwa ................. B63B 35/44 |
| | | | | 405/209 |
| 5,191,162 | A | * | 3/1993 | Czimmek ............. B63B 35/003 |
| | | | | 114/65 R |
| 5,918,306 | A | * | 6/1999 | Kristensen ................ F41F 3/04 |
| | | | | 89/1.801 |
| 5,932,830 | A | * | 8/1999 | Kristensen ............. B64G 1/002 |
| | | | | 89/1.801 |
| 6,024,006 | A | * | 2/2000 | Kindem ................. B63B 27/36 |
| | | | | 89/1.801 |

* cited by examiner

OFFSHORE ROCKET TRANSPORT AND LAUNCH METHOD

CROSS REFERENCE TO THE RELATED APPLICATIONS

This application is based upon and claims priority to Chinese Patent Application No. 202210219623.2, filed on Mar. 8, 2022, the entire contents of which are incorporated herein by reference.

TECHNICAL FIELD

The present disclosure relates to the field of offshore rocket launching, and in particular to an offshore rocket transport and launch method.

BACKGROUND

In recent years, offshore rocket launching has become one of the research hotspots in China. With the gradual improvement of offshore rocket launching technology, the optimization of the rocket transport and launch process has become a crucial task for offshore rocket launching.

During the transport process, the rocket body is fixed on the transport ship through a rocket fixing device. When the rocket body is transported by sea, it may be affected by many environmental factors, such as temperature, humidity, salinity, and overload degree. To keep the rocket body in good condition, the existing transport ship is provided with an environmental protection system and stabilizing and shock absorption devices. The redundant configuration and particularity of the transport ship cause problems, such as poor flexibility and high maintenance cost of the rocket body during the transport process. Before the rocket is transported to the target launch pad by the transport ship, a transport vehicle is used. After the rocket is transported to the target launch pad, the transport ship is docked with the target launch pad, and the rocket body is erected, which is complicated, time-consuming, and labor-intensive. Even after the rocket is transported to the target launch pad in stages, the rocket needs to be assembled and erected, which is difficult and may damage the rocket body. Therefore, there remains a need for a transport tool or method to perform integrated operations, such as transport, erection, and launch of the rocket body, and to solve the problems of poor confidentiality and poor convenience in transporting and launching existing offshore rockets.

SUMMARY

To solve the above technical problems, the present disclosure provides an offshore rocket transport and launch method. The present disclosure facilitates the offshore rocket transport and launch process, prevents the rocket from being affected by the external environment during the launch process, and keeps the rocket in good condition before launch.

An offshore rocket transport and launch method includes the following steps:
S1: assembling a rocket horizontally;
S2: loading the assembled rocket as a whole into a transport cage;
S3: transporting, by a transport vehicle, the transport cage loaded with the rocket to a wharf by land horizontal transport;
S4: transferring the transport cage loaded with the rocket to a transport ship, and transporting the transport cage loaded with the rocket to an offshore rocket launch pad by sea transport;
S5: hoisting, by a hoisting device, the transport cage loaded with the rocket to the rocket launch pad;
S6: opening the transport cage, transferring the rocket to a launching position, and hoisting the transport cage away from the rocket launch pad; and
S7: launching the rocket.

Preferably, in step S4, the transport cage may be vertically or horizontally fixed on the transport ship.

Preferably, if the transport cage is horizontally fixed on the transport ship, step S4 may include:
S41: placing the transport cage on a transport platform with rollers; and
S42: pushing the transport platform to move the transport cage to the transport ship.

Preferably, if the transport cage is vertically fixed on the transport ship, a transport base may be provided below the transport cage. The transport cage may be detachably fixed to the transport base, and the transport base may be provided on a slide rail and may be movable along the slide rail.

Preferably, the slide rail may include an onboard slide rail and a land slide rail. The onboard slide rail and the land slide rail may be collinear and may be closely butted at a connection.

Preferably, the transport cage may include a support frame body, a cage base, a cage top, a cage body, and a rocket fixing device. The cage body has a shell structure with a chamber and may include a first cage body and a second cage body. A hoisting ring may be provided on the cage top; the cage top may be provided at one end of the cage body and may be fixedly connected to the support frame body. The cage base may be provided at the other end of the cage body; the cage base and the cage body may be detachably fixed. The first cage body and the second cage body may be hinged to the support frame body. The cage body, the cage top, the support frame body, and the cage base may form an openable rocket accommodating chamber for accommodating the rocket. The rocket fixing device may be provided in the rocket accommodating chamber and may encircle and secure the rocket in the rocket accommodating chamber.

Preferably, the cage base may include a rocket launching base and an opening and closing device, and the opening and closing device has one end hinged to the rocket launching base and the other end for closely clamping the cage body.

Preferably, the rocket launch pad may include:
a working platform having a U-shaped structure and provided with a launch hole, where the launch hole is located at a notch of the U-shaped structure of the working platform;
a ring mat having a floating tank structure and provided therein with multiple ballast tanks;
a column having an upper end connected to the working platform and a lower end fixedly connected to the ring mat to support the working platform;
a rocket moving device provided on a surface of the working platform and configured to move the rocket to be launched to a preset launching position; and
the hoisting device fixed to the working platform and configured to hoist the rocket from the transport ship to the rocket moving device.

Compared with the prior art, the present application has at least the following beneficial effects.

The present disclosure facilitates the offshore rocket transport and launch process, prevents the rocket from being affected by the external environment during the launch process, and keeps the rocket in good condition before launch. In addition, the present disclosure also improves the offshore rocket launch efficiency.

BRIEF DESCRIPTION OF THE DRAWINGS

Some specific embodiments of the present disclosure will be described in detail below in an illustrative rather than restrictive manner with reference to the drawings. The same reference numerals in the drawings refer to like or similar components or parts. Those skilled in the art should understand that the drawings are not drawn to scale. Drawings.

Figure 1:
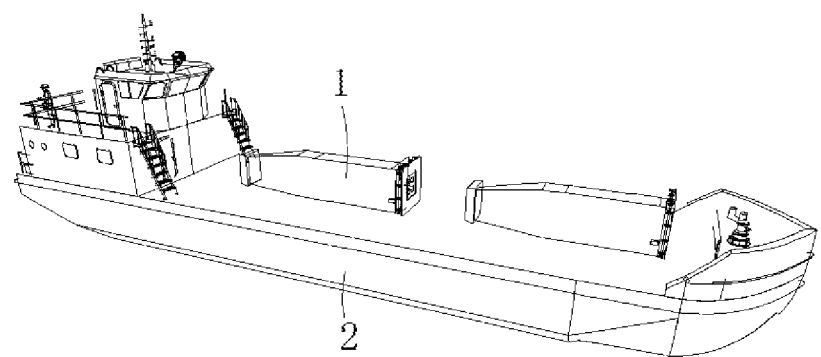
FIG. 1 is a schematic structural diagram of a transport state in which a transport cage loaded with a rocket is placed horizontally and fixed on a transport ship.

REFERENCE NUMERALS 1. transport cage; 2. transport ship; and 3. rocket launch pad;
11. support frame body; 12. hinge; 13. cage body; 14. bracket; 15. clamp; 16. cage body opening and closing device; 17. inspection platform; 18. cage base; 19. cage top; and 110. hoisting ring;
131. first cage body; and 132. second cage body;
1301. connection base; and 1302. connection plane;
1801. rocket launching base; 1802. opening and closing device; 1803. rocket fixing base; and 1804. fixing plane;
31. ring mat; 32. column; 33. working platform; 34. rocket moving device; and 35. hoisting device; and
341. traction mechanism; 342. driving cable; 343. track; 344. transport base; 345. pulley; and 346. launch hole.

DETAILED DESCRIPTION OF THE EMBODIMENTS

To make the objectives, technical solutions, and advantages of the present application clearer, the technical solutions in the present application are clearly and completely described below with reference to the specific embodiments and drawings of the present application. The described embodiments are some, rather than all of the embodiments of the present application. All other embodiments obtained by those of ordinary skill in the art based on the embodiments of the present application without creative efforts should fall within the protection scope of the present application.

Figure 2:
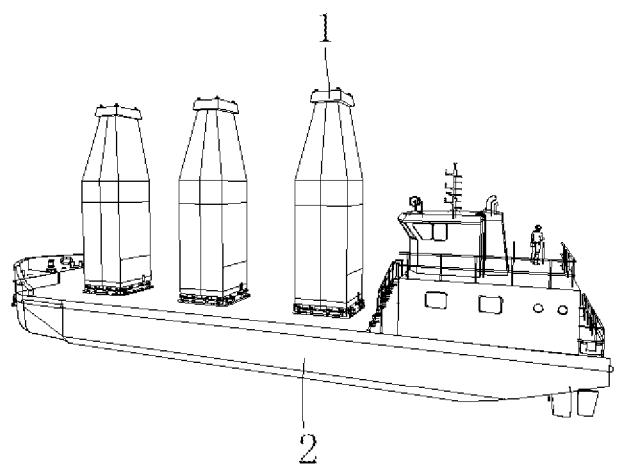
FIG. 2 is a schematic structural diagram of a transport state in which the transport cage loaded with the rocket is vertically placed and fixed on the transport ship.
Figure 3:
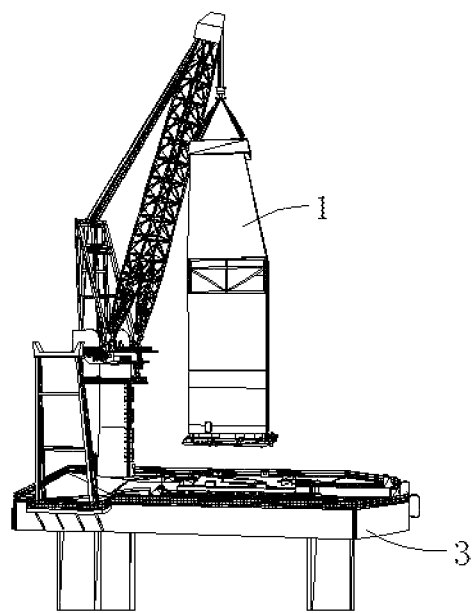
FIG. 3 is a schematic diagram of a hoist state in which the transport cage loaded with the rocket is hoisted to a rocket launch pad.

As shown in FIGS. 1 to 3, an offshore rocket transport and launch method includes the following steps:

S1: Assemble a rocket horizontally.

S2: Load the assembled rocket as a whole into a transport cage 1.

S3: Transport, by a transport vehicle, the transport cage 1 loaded with the rocket to a wharf by land horizontal transport.

S4: Transfer the transport cage 1 loaded with the rocket to a transport ship 2 and transport the transport cage 1 loaded with the rocket to an offshore rocket launch pad by sea transport.

S5: Hoist, by a hoisting device, the transport cage 1 loaded with the rocket to the rocket launch pad 3.

S6: Open the transport cage 1, transfer the rocket to a launching position, and hoist the transport cage 1 away from the rocket launch pad 3.

S7: Launch the rocket.

In step S4, the transport cage 1 is vertically or horizontally fixed on the transport ship 2.

Preferably, the transporting the transport cage 1 loaded with the rocket to a transport ship 2 includes:

S41: Place the transport cage 1 on a transport platform with rollers.

S42: Push the transport platform to move the transport cage 1 to the transport ship 2.

If the transport cage 1 is vertically fixed on the transport ship 2, a transport base is provided below the transport cage 1. The transport cage 1 is detachably fixed to the transport base. The transport base is provided on a slide rail and is movable along the slide rail. The slide rail includes an onboard slide rail and a land slide rail. The onboard slide rail and the land slide rail are collinear and are closely butted at a connection.

Figure 4:
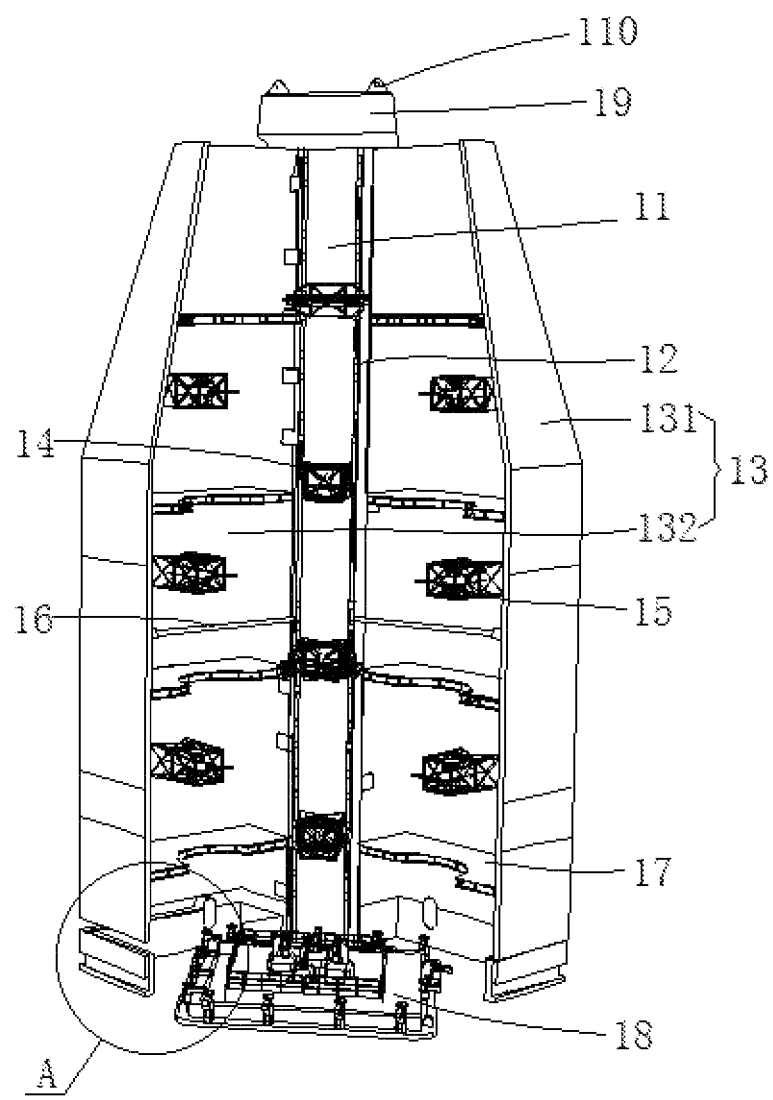
FIG. 4 is a schematic structural diagram of the transport cage.

As shown in FIG. 4, a rocket transport cage includes a support frame body 11, a cage base 18, a cage top 19, a cage body 13, and a rocket fixing device. The cage body 13 has a shell structure with a chamber and includes a first cage body 131 and a second cage body 132. A hoisting ring 110 is provided on the cage top 19. The cage top 19 is provided at one end of the cage body 13 and is fixedly connected to an end of the support frame body 11. The cage base 18 is provided at the other end of the cage body 13 and is detachably fixed to the cage body 13. The cage body 13, the cage top 19, the support frame body 11, and the cage base 18 together form an openable rocket accommodating chamber for accommodating a rocket. The rocket fixing device is provided in the rocket accommodating chamber and encircles and secures the rocket in the rocket accommodating chamber.

Specifically, the first cage body 131 and the second cage body 132 are enclosure structures. The first cage body 131 is hinged to one side of the support frame body 11 through a hinge 12, and the second cage body 132 is hinged to the other side of the support frame body 11 through the hinge 12. The first cage body 131 has one end in contact with a surface of the cage top 19 and the other end detachably fixed to the cage base 18. Likewise, the second cage body 132 has one end in contact with the surface of the cage top 19 and the other end detachably fixed to the cage base 18.

A cage body opening and closing device 16 is provided in the rocket accommodating chamber and has one end hinged to an inner wall of the cage body 13 and the other end hinged to the support frame body 11. The cage body opening and closing device 16 includes a driving mechanism and a connection rod that are interconnected. The driving mechanism is one of an air cylinder, a hydraulic cylinder, and an electric push rod. Under a telescopic action of the driving mechanism, the first cage body 131 and the second cage body 132 are rotated along a hinge axis, thereby opening or closing the first cage body 131 and the second cage body 132. After being closed, the first cage body 131 and the second cage body 132 are fixed to the cage base 18. In this way, during transport, the first cage body 131 and the second cage body 132 are always in a closed state. In the closed state, the first cage body 131, the second cage body 132, the cage top 19, the support frame body 11, and the cage base 18 together form the openable rocket accommodating chamber for accommodating the rocket. The rocket accommodating chamber is sealed to reduce the influence of environmental factors during the rocket transport process and ensure that the rocket body is in good condition.

The rocket fixture includes a bracket 14 and clamps 15. The bracket 14 is fixed to the support frame body 11 in the rocket accommodating chamber and is located directly under the rocket during horizontal transport to support the rocket. The clamps 15 are fixed to the inner walls of the first cage body 131 and the second cage body 132, are symmetrically arranged, and are located on two sides of the rocket during horizontal transport to fix the two sides of the rocket. The bracket 14 and the clamps 15 have arc-shaped surfaces adapted to the rocket and together form a space suitable for the diameter of the rocket to fix the rocket during transport and prevent the rocket from being displaced in the rocket accommodating chamber.

The cage body 13 is further provided therein with a cage body support frame and inspection platforms 17. The cage body support frame is attached to the cage body 13 and is fixedly connected to enhance the strength of the cage body 13 to prevent the cage body from being deformed or damaged due to insufficient strength during the rocket transport process. The inspection platforms 17 are symmetrically fixed to the inner walls of the first cage body 131 and the second cage body 132 and are arranged parallel to each other. When the cage body 13 is in a standing state, the inspection platforms 17 have respective surfaces in a horizontal state, such that an inspector can enter the inspection platforms 17 to inspect or maintain the rocket.

Figure 5:
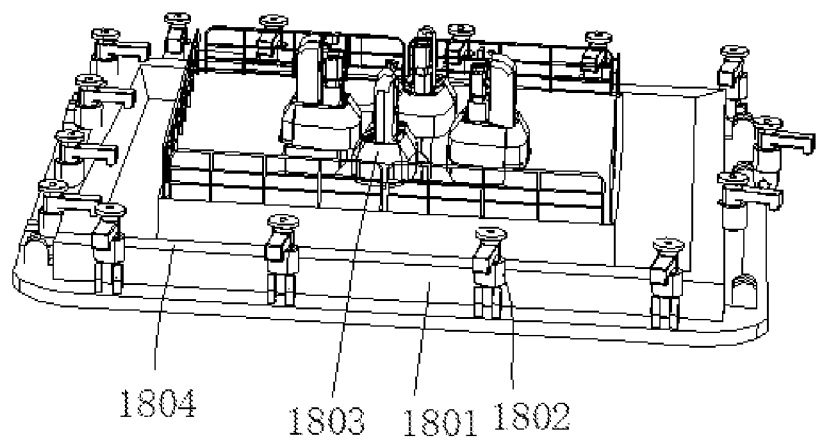
FIG. 5 is a schematic structural diagram of a cage base.

As shown in FIG. 5, the cage base 18 includes a rocket launching base 1801, an opening and closing device 1802, and a rocket fixing base 1803. The rocket launching base 1801 is served as a tray for the rocket until the launch of the rocket is completed. The rocket fixing base 1803 is provided on the upper surface of the rocket launching base 1801 to support the rocket in the cage body 13 in a standing state. The opening and closing device 1802 has one end hinged to the rocket launching base 1801 and the other end for closely clamping the cage body 13, such that the cage body 13 and the cage base 18 are detachably fixed.

Preferably, a fixing plane 1804 is provided on the rocket launching base 1801. The opening and closing device 1802 is provided close to the fixing plane 1804. The opening and closing device 1802 and the fixing plane 1804 jointly press the cage body 13 and the cage base 18 to realize the detachable connection between the cage body and the cage base.

Figure 6:
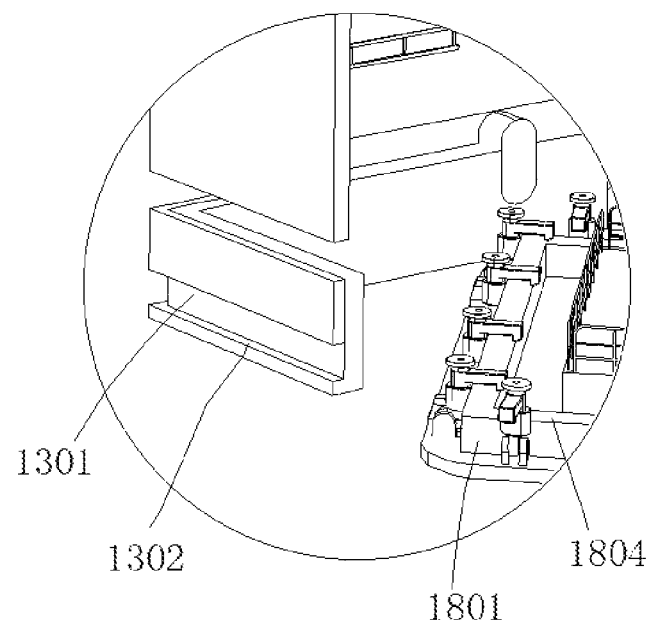
FIG. 6 is a detail of A shown in FIG. 4.

As shown in FIG. 6, a connection base 1301 is provided at one end of the cage body 13 close to the cage base 18. A connection plane 1302 is provided on the connection base 1301. When the cage body 13 is rotated to fit with the cage base 18, the opening and closing device 1802 presses the connection plane 1302, such that the connection plane 1302 is closely attached to the fixing plane 1804 to realize the fixed connection between the cage body 13 and the cage base 18.

Figure 7:
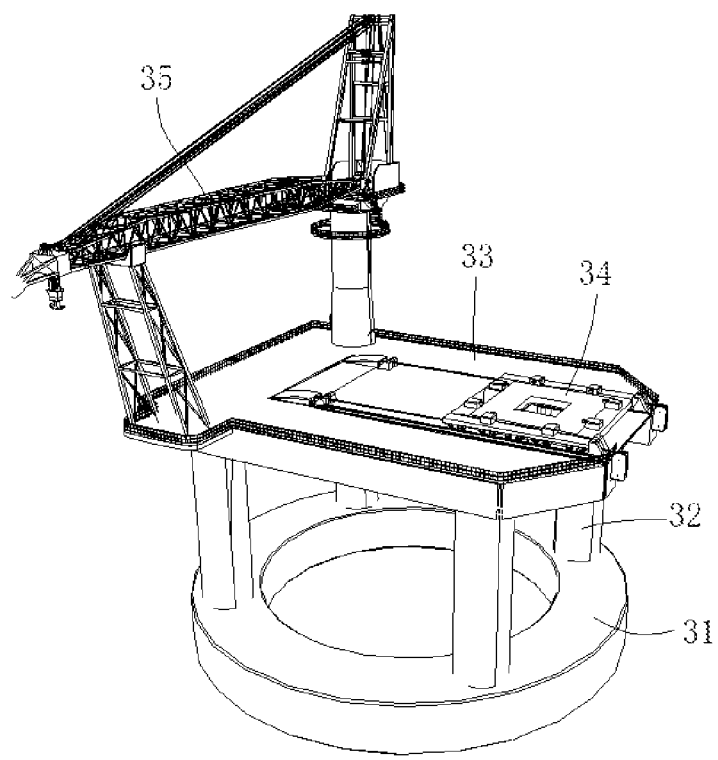
FIG. 7 is a full structural diagram illustrating the overall structure of the rocket launch pad.

As shown in FIG. 7, the rocket launch pad 3 includes a ring mat 31, a column 32, a working platform 33, a rocket moving device 34, and a hoisting device 35. The working platform 33 is a U-shaped structure with a notch. The ring mat 31 is a floating tank structure, which is provided therein with multiple ballast tanks connected to a water pump. The water pump pumps seawater in or out to make the ring mat 31 sink and float. The ring mat 31 can be seated on the seabed after seawater is pumped into the ballast tanks, and its ring structure can balance during the process of pumping seawater in or out of the ballast tank. The column 32 has an upper end connected to the working platform 33 and a lower end fixedly connected to the ring mat 31 to support the working platform 33. The rocket moving device 34 is provided on a surface of the working platform 33 and is configured to move the rocket to be launched to a preset launching position. The hoisting device 35 is fixed to the working platform 33 and is configured to hoist the rocket to the rocket moving device 34.

Figure 8:
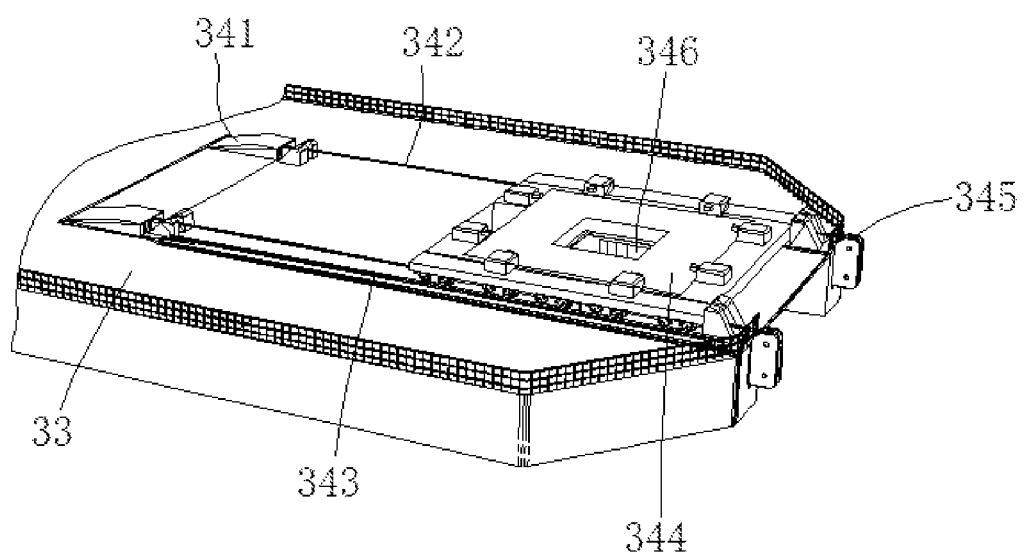
FIG. 8 is a structural diagram illustrating the partial structure of a working platform of the rocket launch pad.

As shown in FIG. 8, a launch hole 346 is provided at the notch of the U-shaped structure of the working platform 33 for the ejection of a tail flame when the rocket is launched. The rocket moving device 34 includes a traction mechanism 341, a transport base 344, and a track 343. The track 343 is provided on the surface of the working platform 33. The traction mechanism 341 is connected to the transport base 344 and drives the transport base 344 to move along the track 343.

Specifically, the traction mechanism includes a pulley 345, a driving cable 342, and a driving mechanism 341 with a driving wheel. The pulley 345 is fixed to the working platform 33 through a pulley base and is rotatably connected to the working platform. The driving cable 342 has an annular structure and has a straight portion in parallel with the track 343. The driving wheel and the pulley 345 inscribe and tension the annular structure of the driving cable 342. The transport base 344 is fixedly connected to the driving cable 342, such that the transport base 344 moves with the motion of the driving cable 342.

For ease of description, the spatially relative terms, such as "above", "on the upper side of", "on the upper surface of", and "on", can be used to describe the spatial positional relationship between components or features shown in the drawings. It should be understood that the spatially relative terms are intended to encompass different orientations of the components in use or operation in addition to those shown in the drawings. For example, if a component in the drawing is inverted, it is described as a component "above other component or structure" or "on other component or structure". Therefore, the component will be positioned as "below other component or structure" or "under other component or structure". Therefore, the exemplary term "above" may include both orientations "above" and "below". The component may also be positioned in other different ways (rotated by 90 degrees or in other orientations), but the relative description of the space should be explained accordingly.

It should be noted that the terms used herein are merely used for describing the specific embodiments but are not intended to limit the exemplary embodiments of the present disclosure. As used herein, the singular form is also intended to include the plural form unless otherwise indicated obviously from the context. Furthermore, it should be further understood that the terms "includes" and/or "including" used in this specification specify the presence of stated features, steps, operations, devices, components, and/or a combination thereof.

It should be noted that the terms "first", "second", and so on in the description and claims of this application and the above accompanying drawings are intended to distinguish between similar objects but do not necessarily indicate a specific order or sequence. It should be understood that the data used in such a way may be exchanged under proper conditions to make it possible to implement the described examples of this application in sequences except those illustrated or described herein.

The above described are merely preferred embodiments of the present disclosure and are not intended to limit the present disclosure. Those skilled in the art may make various changes and modifications to the present disclosure. Any modifications, equivalent substitutions, improvements, and the like made within the spirit and principle of the present disclosure should be included within the protection scope of the present disclosure.

What is claimed is:

1. An offshore rocket transport and launch method, comprising the following steps:
   S1: assembling a rocket horizontally;
   S2: loading the rocket as a whole into a transport cage to obtain a transport cage loaded with the rocket;
   S3: transporting, by a transport vehicle, the transport cage loaded with the rocket to a wharf by a land horizontal transport;
   S4: transferring the transport cage loaded with the rocket to a transport ship and transporting the transport cage loaded with the rocket to an offshore rocket launch pad by a sea transport;
   S5: hoisting, by a hoisting device, the transport cage loaded with the rocket to the offshore rocket launch pad;
   S6: opening the transport cage loaded with the rocket, transferring the rocket to a launching position, and hoisting the transport cage away from the offshore rocket launch pad; and
   S7: launching the rocket.

2. The offshore rocket transport and launch method according to claim 1, wherein in step S4, the transport cage loaded with the rocket is vertically or horizontally fixed on the transport ship.

3. The offshore rocket transport and launch method according to claim 2, wherein if the transport cage loaded with the rocket is horizontally fixed on the transport ship, step S4 comprises:
   S41: placing the transport cage loaded with the rocket on a transport platform with rollers; and
   S42: pushing the transport platform to move the transport cage loaded with the rocket to the transport ship.

4. The offshore rocket transport and launch method according to claim 2, wherein if the transport cage loaded with the rocket is vertically fixed on the transport ship, a transport base is provided below the transport cage loaded with the rocket; the transport cage loaded with the rocket is detachably fixed to the transport base; and the transport base is provided on a slide rail and the transport base is movable along the slide rail.

5. The offshore rocket transport and launch method according to claim 4, wherein the slide rail comprises an onboard slide rail and a land slide rail; and the onboard slide rail and the land slide rail are collinear, and the onboard slide rail and the land slide rail are closely butted at a connection.

6. The offshore rocket transport and launch method according to claim 1, wherein the transport cage comprises a support frame body, a cage base, a cage top, a cage body, and a rocket fixing device;
   wherein the cage body has a shell structure, the shell structure is with a chamber, and the cage body comprises a first cage body and a second cage body; a hoisting ring is provided on the cage top; the cage top is provided at a first end of the cage body and the cage top is fixedly connected to the support frame body; the cage base is provided at a second end of the cage body; the cage base and the cage body are detachably fixed; the first cage body and the second cage body are hinged to the support frame body; the cage body, the cage top, the support frame body, and the cage base form an openable rocket accommodating chamber, wherein the openable rocket accommodating chamber is for accommodating the rocket; and the rocket fixing device is provided in the openable rocket accommodating chamber, and the rocket fixing device encircles the rocket and the rocket fixing device secures the rocket, wherein the rocket is in the openable rocket accommodating chamber.

7. The offshore rocket transport and launch method according to claim 6, wherein the cage base comprises a rocket launching base and an opening and closing device; and the opening and closing device has a first end and a second end, wherein the first end is hinged to the rocket launching base and the second end is for closely clamping the cage body.

8. The offshore rocket transport and launch method according to claim 1, wherein the offshore rocket launch pad comprises a working platform, a ring mat, a column, a rocket moving device, and the hoisting device;
   wherein the working platform has a U-shaped structure and the working platform is provided with a launch hole, wherein the launch hole is located at a notch of the U-shaped structure of the working platform;
   the ring mat has a floating tank structure and the ring mat is provided with a plurality of ballast tanks, wherein the plurality of ballast tanks is in the ring mat;
   the column has an upper end and a lower end, wherein the upper end is connected to the working platform and the lower end is fixedly connected to the ring mat, the column is configured to support the working platform;
   the rocket moving device is provided on a surface of the working platform and the rocket moving device is configured to move the rocket to be launched to a preset launching position; and
   the hoisting device is fixed to the working platform and the hoisting device is configured to hoist the rocket from the transport ship to the rocket moving device.

\* \* \* \* \*